US012659179B2

(12) United States Patent (10) Patent No.: US 12,659,179 B2
Feng (45) Date of Patent: Jun. 16, 2026

(54) REGISTRATION AND EXECUTION METHODS AND APPARATUSES OF TIMED SMART CONTRACT IN BLOCKCHAIN

(71) Applicant: Digital Currency Institute, The People's Bank of China, Beijing (CN)

(72) Inventor: Kaikai Feng, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 243 days.

(21) Appl. No.: 18/276,859

(22) PCT Filed: Feb. 10, 2022

(86) PCT No.: PCT/CN2022/075944
§ 371 (c)(1),
(2) Date: Aug. 10, 2023

(87) PCT Pub. No.: WO2022/171189
PCT Pub. Date: Aug. 18, 2022

(65) Prior Publication Data
US 2024/0146553 A1 May 2, 2024

(30) Foreign Application Priority Data
Feb. 10, 2021 (CN) .......................... 202110185548.8

(51) Int. Cl.
*H04L 9/00* (2022.01)
(52) U.S. Cl.
CPC ...................................... *H04L 9/50* (2022.05)

(58) Field of Classification Search
CPC ....... H04L 9/50; H04L 9/3239; H04L 3/3297; H04L 67/104; H04L 67/10;
(Continued)

(56) References Cited

U.S. PATENT DOCUMENTS 11,398,911 B1 7/2022 Gunning
2009/0178051 A1* 7/2009 Zyuban ............... G06F 11/2025
718/104
(Continued)

FOREIGN PATENT DOCUMENTS

CN 109872157 A 6/2019
CN 111818185 A 10/2020
(Continued)

OTHER PUBLICATIONS

The search report of counterpart EP application No. 22752349.5 issued on Jan. 27, 2025.
(Continued)

*Primary Examiner* — Oleg Survillo
(74) *Attorney, Agent, or Firm* — The Sun IP Law

(57) ABSTRACT

Registration and execution methods and apparatuses of a timed smart contract in a blockchain. The method includes: a registration request of a timed smart contract is received (S101); according to the registration request, the timed smart contract is registered to an oracle machine contract pre-deployed on the blockchain (S102); and an interface for connecting the timed smart contract to the oracle machine contract is generated for the timed smart contract, so that the oracle machine contract triggers execution of the timed smart contract by means of the interface in a timing manner (S103). The method achieves the management and execution of the timed smart contract by means of the blockchain.

9 Claims, 6 Drawing Sheets

(58) Field of Classification Search
CPC ............ H04L 67/1097; G06Q 2220/00; G06Q
30/06; G06Q 40/02; G06Q 40/04; G06F
21/64
See application file for complete search history.

(56) References Cited

U.S. PATENT DOCUMENTS

| | | | | |
|---|---|---|---|---|
| 2015/0143375 | A1* | 5/2015 | Bruso ................. | G06F 9/45533 |
| | | | | 718/101 |
| 2016/0357596 | A1* | 12/2016 | Busaba .................. | A63B 69/18 |
| 2018/0218176 | A1* | 8/2018 | Voorhees .............. | G06Q 20/02 |
| 2018/0331835 | A1 | 11/2018 | Jackson | |
| 2019/0013948 | A1 | 1/2019 | Mercuri | |
| 2019/0080406 | A1 | 3/2019 | Molinari | |
| 2019/0095880 | A1 | 3/2019 | Glover | |
| 2019/0114706 | A1 | 4/2019 | Bell | |
| 2019/0158275 | A1* | 5/2019 | Beck .................. | G06Q 20/0658 |
| 2019/0180291 | A1 | 6/2019 | Schmeling | |
| 2019/0188399 | A1 | 6/2019 | Palaniappan | |
| 2019/0310878 | A1* | 10/2019 | Qiu ..................... | G06Q 20/405 |
| 2019/0361842 | A1 | 11/2019 | Wood | |
| 2019/0364049 | A1* | 11/2019 | Boss ...................... | G06F 21/45 |
| 2020/0005282 | A1 | 1/2020 | Kim | |
| 2020/0007513 | A1 | 1/2020 | Gleichauf | |
| 2020/0013025 | A1* | 1/2020 | Verma .................. | H04L 9/3297 |
| 2020/0051186 | A1* | 2/2020 | Sarker ................... | G07F 15/003 |
| 2020/0111092 | A1 | 4/2020 | Wood | |
| 2020/0177519 | A1* | 6/2020 | Zou ....................... | H04L 9/3239 |
| 2020/0233966 | A1* | 7/2020 | Bursell ................ | G06F 16/182 |
| 2020/0234294 | A1* | 7/2020 | Bursell ..................... | H04L 9/32 |
| 2020/0250752 | A1* | 8/2020 | Sugarman ............. | H04L 9/3239 |
| 2020/0274692 | A1* | 8/2020 | Simon ................... | H04L 9/0631 |
| 2020/0357084 | A1* | 11/2020 | Lerato Hunn ........ | G06F 40/186 |
| 2020/0387500 | A1 | 12/2020 | Malfiza Garcia de Macedo | |
| 2021/0012248 | A1 | 1/2021 | Narang et al. | |
| 2021/0135855 | A1 | 5/2021 | Sunkavally | |
| 2021/0166183 | A1* | 6/2021 | Zhu ........................ | G06F 16/953 |
| 2021/0327216 | A1* | 10/2021 | Naramore .......... | G07F 17/3288 |
| 2022/0027319 | A1* | 1/2022 | Narayanam ......... | G06F 16/1748 |
| 2024/0119444 | A1* | 4/2024 | Hertzog ................ | G06Q 40/02 |
| 2024/0121121 | A1* | 4/2024 | Feng .................... | H04L 67/104 |

FOREIGN PATENT DOCUMENTS

| | | |
|---|---|---|
| CN | 112837154 A | 5/2021 |
| CN | 112837157 A | 5/2021 |

OTHER PUBLICATIONS

The Non-Final Office Action of related U.S. Appl. No. 18/276,878 issued on May 8, 2025.

* cited by examiner

Fig. 3

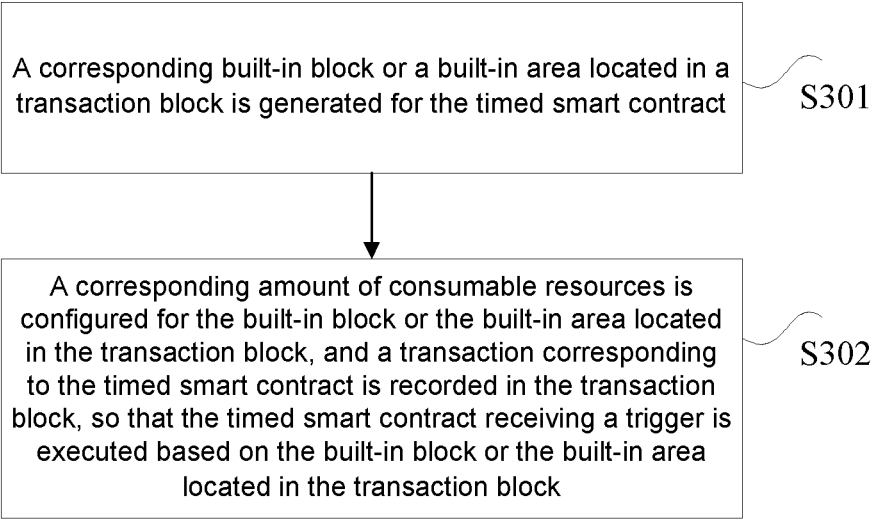

A corresponding built-in block or a built-in area located in a transaction block is generated for the timed smart contract — S301

A corresponding amount of consumable resources is configured for the built-in block or the built-in area located in the transaction block, and a transaction corresponding to the timed smart contract is recorded in the transaction block, so that the timed smart contract receiving a trigger is executed based on the built-in block or the built-in area located in the transaction block — S302

Fig. 4

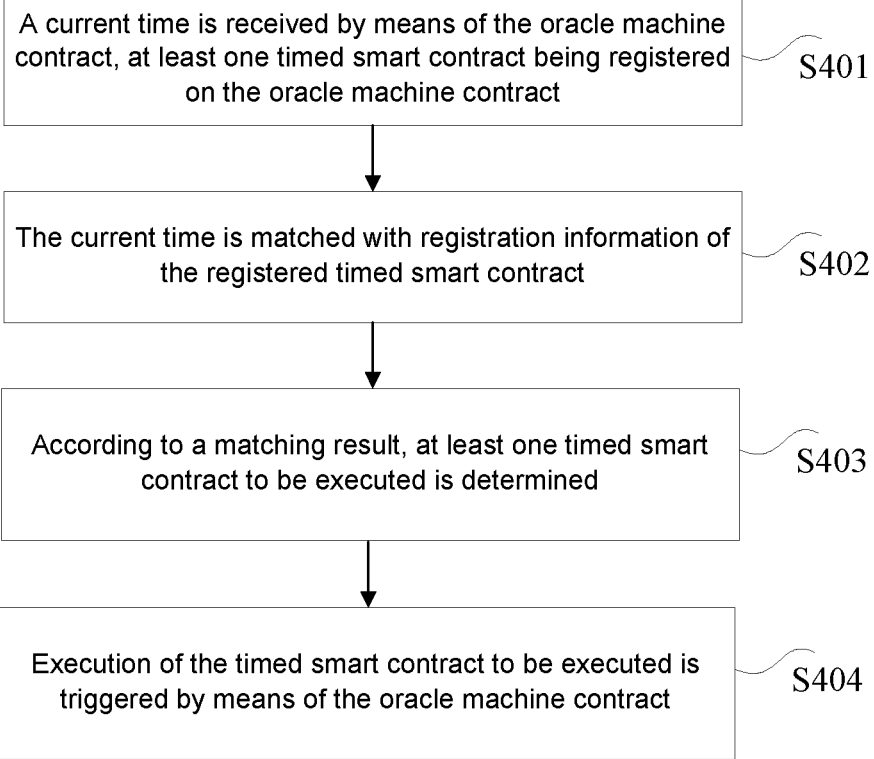

A current time is received by means of the oracle machine contract, at least one timed smart contract being registered on the oracle machine contract — S401

The current time is matched with registration information of the registered timed smart contract — S402

According to a matching result, at least one timed smart contract to be executed is determined — S403

Execution of the timed smart contract to be executed is triggered by means of the oracle machine contract — S404

Fig. 5

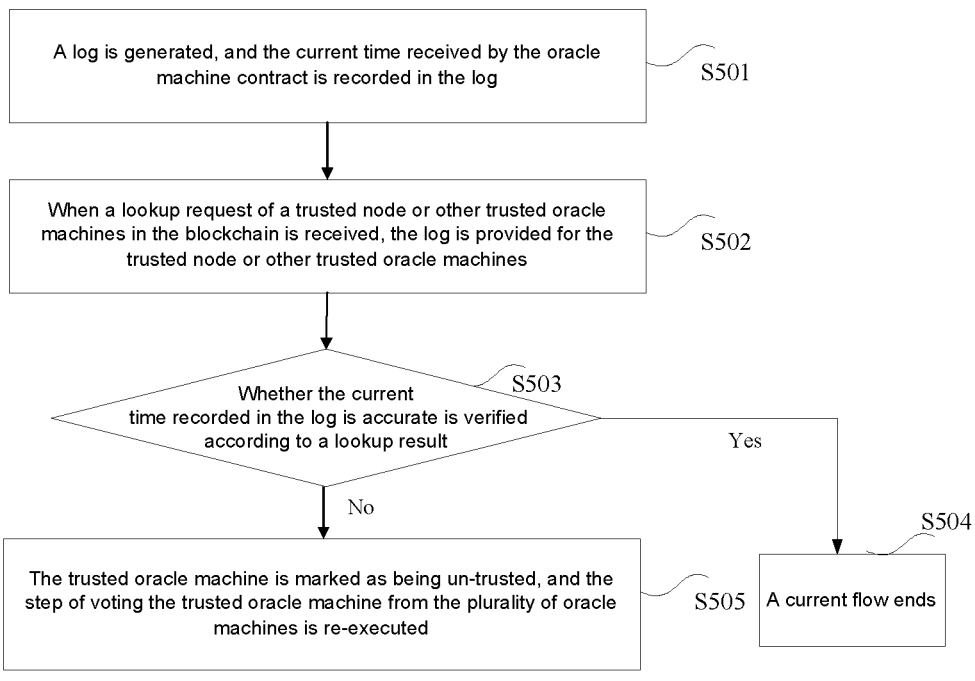

A log is generated, and the current time received by the oracle machine contract is recorded in the log          S501

When a lookup request of a trusted node or other trusted oracle machines in the blockchain is received, the log is provided for the trusted node or other trusted oracle machines          S502

Whether the current time recorded in the log is accurate is verified according to a lookup result          S503

Yes

No

The trusted oracle machine is marked as being un-trusted, and the step of voting the trusted oracle machine from the plurality of oracle machines is re-executed          S505

S504          A current flow ends

Fig. 6

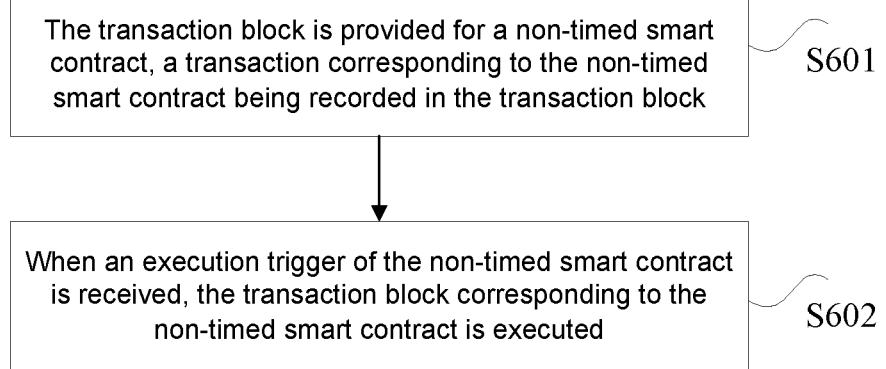

The transaction block is provided for a non-timed smart contract, a transaction corresponding to the non-timed smart contract being recorded in the transaction block          S601

When an execution trigger of the non-timed smart contract is received, the transaction block corresponding to the non-timed smart contract is executed          S602

Fig. 7

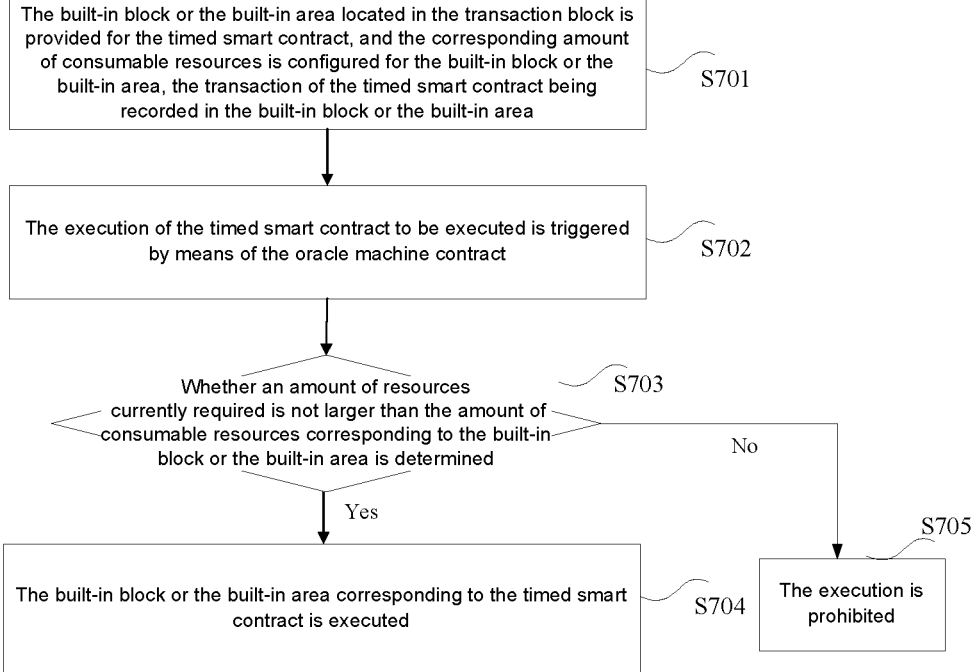

The built-in block or the built-in area located in the transaction block is provided for the timed smart contract, and the corresponding amount of consumable resources is configured for the built-in block or the built-in area, the transaction of the timed smart contract being recorded in the built-in block or the built-in area    S701

The execution of the timed smart contract to be executed is triggered by means of the oracle machine contract    S702

Whether an amount of resources currently required is not larger than the amount of consumable resources corresponding to the built-in block or the built-in area is determined    S703

No

Yes

The built-in block or the built-in area corresponding to the timed smart contract is executed    S704

The execution is prohibited    S705

Fig. 8

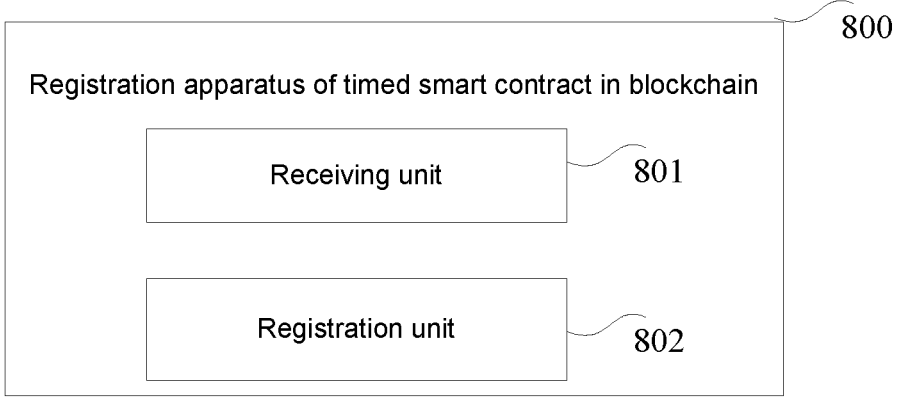

Registration apparatus of timed smart contract in blockchain    800

Receiving unit    801

Registration unit    802

REGISTRATION AND EXECUTION METHODS AND APPARATUSES OF TIMED SMART CONTRACT IN BLOCKCHAIN

TECHNICAL FIELD

The present disclosure relates to the field of blockchains, and in particular to registration and execution methods and apparatuses of a timed smart contract in a blockchain.

BACKGROUND

A blockchain may be thought of as a decentralized and trusted distributed ledger. Since the blockchain consists of many nodes to form an end-to-end network, there is no centralized apparatus and management mechanism, and data is stored and recorded in the blockchain in a distributed manner, so that the blockchain is tamper-resistant. Therefore, digitally writing a smart contract into the blockchain and completing a corresponding transaction by executing the smart contract in the blockchain have been increasingly favored by various institutions.

At present, the smart contract existing in the blockchain typically requires an external transaction to trigger execution. For some transactions that need to be triggered in a timing manner, such as realizing fixed-time reconciliation between financial institutions, it is still an urgent problem to be solved by existing smart contract management and execution modes.

SUMMARY

In view of this, embodiments of the present disclosure provide registration and execution methods and apparatuses of a timed smart contract in a blockchain, and a system, which achieves the management and execution of the timed smart contract by means of the blockchain.

In order to achieve the above objective, according to one aspect of the embodiments of the present disclosure, a registration method of a timed smart contract in a blockchain is provided, which includes the following operations.

A registration request of the timed smart contract is received.

According to the registration request, the timed smart contract is registered to an oracle machine contract pre-deployed on the blockchain.

An interface for connecting the timed smart contract to the oracle machine contract is generated for the timed smart contract, so that the oracle machine contract triggers execution of the timed smart contract by means of the interface in a timing manner.

As at least one alternative embodiment,

The oracle machine contract includes a first registry.

The registration request specifies a contract feature identification and trigger time information corresponding to the timed smart contract.

The step of registering the timed smart contract to the oracle machine contract includes the following operation.

The contract feature identification and the trigger time information are correspondingly stored in the first registry, so that the oracle machine contract triggers the timed smart contract according to the trigger time information in a timing manner.

As at least one alternative embodiment, the oracle machine contract includes a second registry.

The step of registering the timed smart contract to the oracle machine contract includes the following operations.

A contract feature identification and a time trigger function corresponding to the timed smart contract are obtained from the timed smart contract.

The contract feature identification and the time trigger function are correspondingly stored in the second registry, so that the oracle machine contract triggers, according to the time trigger function in a timing manner, the timed smart contract.

As at least one alternative embodiment, the registration request further specifies logic feature identifications corresponding to a plurality of processing logics included in the timed smart contract.

The trigger time information includes: logic trigger time information corresponding to each of the plurality of processing logics.

The step of correspondingly storing the contract feature identification and the trigger time information in the first registry includes the following operation.

The contract feature identification, each of the logic feature identification, and the logic trigger time information corresponding to each of the plurality of processing logics are correspondingly stored in the first registry, so that the oracle machine contract triggers the corresponding processing logic according to the logic trigger time information in the timing manner.

As at least one alternative embodiment, the step of registering the timed smart contract to the oracle machine contract further includes the following operations.

When the number of an extracted time trigger functions is at least two, the logic feature identification of the processing logic corresponding to each of the plurality of time trigger functions is obtained from the timed smart contract.

The contract feature identification, the at least two of the time trigger functions, and the logic feature identification corresponding to each of the at least two of time trigger functions are correspondingly stored in the second registry, so that the oracle machine contract triggers the corresponding processing logic according to the time trigger function in the timing manner.

As at least one alternative embodiment, the registration method of the timed smart contract in the blockchain further includes the following operation.

A corresponding transaction block is generated for a non-timed smart contract, and a transaction corresponding to the non-timed smart contract is recorded in the transaction block, so that the non-timed smart contract is executed based on the transaction block.

As at least one alternative embodiment, the registration method of the timed smart contract in the blockchain further includes the following operations.

A corresponding built-in block or a built-in area located in the transaction block is generated for the timed smart contract.

A corresponding amount of consumable resources is configured for the built-in block or the built-in area located in the transaction block, and a transaction corresponding to the timed smart contract is recorded in the transaction block, so that the timed smart contract receiving a trigger is executed based on the built-in block or the built-in area located in the transaction block.

In a second aspect, the embodiments of the present disclosure provide an execution method of a timed smart contract in a blockchain, which includes the following operations.

A current time is received by means of an oracle machine contract. At least one timed smart contract is registered on the oracle machine contract.

The current time is matched with registration information of the at least one registered timed smart contract.

According to a matching result, at least one timed smart contract to be executed is determined.

Execution of the timed smart contract to be executed is triggered by means of the oracle machine contract.

As at least one alternative embodiment, the execution method of the timed smart contract in the blockchain further includes that: a trusted oracle machine is voted from a plurality of oracle machines.

The step of determining the current time by means of the oracle machine contract includes the following operation.

The current time sent by the trusted oracle machine is received by means of the oracle machine contract.

As at least one alternative embodiment, the step of voting the trusted oracle machine from the plurality of oracle machines includes the following operation.

The trusted oracle machine is determined from the plurality of oracle machines by adopting a polling manner.

As at least one alternative embodiment, an oracle machine with a voting ratio not lower than a preset ratio threshold is selected from the plurality of oracle machines as the trusted oracle machine by adopting a voting manner.

As at least one alternative embodiment, the execution method of the timed smart contract in the blockchain further includes the following operations.

A log is generated, and the current time received by the oracle machine contract is recorded in the log.

When a lookup request of a trusted node or other trusted oracle machines in the blockchain is received, the log is provided to the trusted node or other trusted oracle machines.

Whether the current time recorded in the log is accurate is verified according to a lookup result.

If not, the trusted oracle machine is marked as being un-trusted, and the step of voting the trusted oracle machine from the plurality of oracle machines is re-executed.

As at least one alternative embodiment, a contract feature identification corresponding to the timed smart contract and a corresponding trigger time are stored in a first registry included in the oracle machine contract.

The step of matching the current time with the at least one registered timed smart contract includes the following operation.

At least one target trigger time consistent with the current time is found in the first registry.

The step of determining the at least one timed smart contract to be executed includes the following operation.

A corresponding target contract feature identification is matched for each of the target trigger times, and the timed smart contract corresponding to the target contract feature identification is determined as the timed smart contract to be executed.

As at least one alternative embodiment, a contract feature identification and a time trigger function corresponding to the timed smart contract are stored in a second registry included in the oracle machine contract.

The step of matching the current time with the at least one registered timed smart contract includes the following operation.

At least one target time trigger function that the current time satisfies is found in the second registry.

The step of determining the at least one timed smart contract to be executed includes the following operation.

A corresponding target contract feature identification is matched for each of the at least one target time trigger function, and the timed smart contract corresponding to the target contract feature identification is determined as the timed smart contract to be executed.

As at least one alternative embodiment, logic feature identifications corresponding to a plurality of processing logics and logic trigger time information corresponding to each of the plurality of processing logics included in the timed smart contract are further stored in the first registry.

The step of matching the current time with the at least one registered timed smart contract further includes the following operations.

At least one piece of target logic trigger time information consistent with the current time is found.

A corresponding target contract feature identification and a target logic feature identification are matched for each piece of the target logic trigger time information.

As at least one alternative embodiment, logic feature identifications corresponding to the plurality of processing logics and the time trigger function corresponding to each of the plurality of processing logics included in the timed smart contract are further stored in the second registry.

The step of matching the current time with the at least one registered timed smart contract further includes the following operations.

At least one target time trigger function that the current time satisfies is found in the second registry.

The corresponding target contract feature identification and a target logic feature identification are matched for each of the at least one target time trigger function.

As at least one alternative embodiment, after determining the timed smart contract to be executed, the method further includes that: a processing logic to be executed in the timed smart contract to be executed is determined according to the target logic feature identification.

The step of triggering the timed smart contract to be executed by means of the oracle machine contract includes that: execution of the processing logic to be executed in the timed smart contract to be executed is triggered by means of the oracle machine contract.

As at least one alternative embodiment, the execution method of the timed smart contract in the blockchain further includes the following operations.

A transaction block is provided for a non-timed smart contract. A transaction corresponding to the non-timed smart contract is recorded in the transaction block.

When an execution trigger of the non-timed smart contract is received, the transaction block corresponding to the non-timed smart contract is executed.

As at least one alternative embodiment, the execution method of the timed smart contract in the blockchain further includes that: a built-in block or a built-in area located in the transaction block is provided for the timed smart contract, and a corresponding amount of consumable resources is configured for the built-in block or the built-in area. A transaction of the timed smart contract is recorded in the built-in block or the built-in area.

After the step of triggering the timed smart contract to be executed by means of the oracle machine contract, the method further includes the following operation.

Whether an amount of resources currently required is not larger than the amount of consumable resources corresponding to the built-in block or the built-in area is determined. If so, the built-in block or the built-in area corresponding to the timed smart contract is executed. If not, the execution is prohibited.

In a third aspect, the embodiments of the present disclosure provide a registration apparatus of a timed smart contract in a blockchain, which includes: a receiving unit and a registration unit.

The receiving unit is configured to receive a registration request of the timed smart contract.

The registration unit is configured to register, according to the registration request received by the receiving unit, the timed smart contract to an oracle machine contract predeployed on the blockchain; and to generate, for the timed smart contract, an interface for connecting the timed smart contract to the oracle machine contract, so that the oracle machine contract triggers execution of the timed smart contract by means of the interface in a timing manner.

In a fourth aspect, the embodiments of the present disclosure provide an execution apparatus of a timed smart contract in a blockchain, which includes: a time determination unit, a matching unit, and an execution unit.

The time determination unit is configured to determine, by means of an oracle machine contract, a current time. At least one timed smart contract is registered on the oracle machine contract.

The matching unit is configured to match the current time determined by the time determination unit with the registered timed smart contract.

The execution unit is configured to determine, according to a matching result of the matching unit, at least one timed smart contract to be executed; and to trigger, by means of the oracle machine contract, execution of the timed smart contract to be executed.

One embodiment of the present disclosure has the following advantages or beneficial effects that: by registering the timed smart contract deployed on the blockchain on to the oracle machine contract, the interface for connecting the timed smart contract to the oracle machine contract is generated for the timed smart contract, and the oracle machine contract triggers the execution of the timed smart contract by means of the interface in a timing manner, so as to achieve the management and execution of the timed smart contract by means of the blockchain. In addition, since the registration and execution of the timed smart contract may rely on the oracle machine contract, and the communication with an oracle machine outside the blockchain is performed by means of the oracle machine contract, so that the direct communication between the timed smart contract and the oracle machine outside the blockchain is avoided. At the same time, communication content between the timed smart contract and the oracle machine contract is relatively simple, so the oracle machine contract is relatively easy to maintain. In addition, by maintaining the oracle machine contract, the timed smart contract can be effectively prevented from external attacks, and the security of the timed smart contract is guaranteed.

Further implications of the above non-conventional alternatives are described below in combination with the Alternative implementation modes.

BRIEF DESCRIPTION OF THE DRAWINGS

The drawings are used for a better understanding of the present disclosure, and do not constitute improper limitations to the present disclosure. Herein:

FIG. 3 is a schematic diagram of a main flow of a registration method of a timed smart contract in a blockchain according to another embodiment of the present disclosure.

FIG. 4 is a schematic diagram of a main flow of an execution method of a timed smart contract in a blockchain according to an embodiment of the present disclosure.

FIG. 5 is a schematic diagram of the main flow of an execution method of a timed smart contract in a blockchain according to another embodiment of the present disclosure.

FIG. 6 is a schematic diagram of a main flow of executing a non-timed smart contract according to another embodiment of the present disclosure.

FIG. 7 is a schematic diagram of a main flow of executing a timed smart contract according to another embodiment of the present disclosure.

FIG. 8 is a schematic diagram of main units of a registration apparatus of a timed smart contract in a blockchain according to an embodiment of the present disclosure.

DETAILED DESCRIPTION OF THE EMBODIMENTS

Exemplary embodiments of the present disclosure are described in detail below with reference to the drawings, including various details of the embodiments of the present disclosure to facilitate understanding, and should be regarded as merely exemplary. Thus, those of ordinary skill in the art shall understand that, variations and modifications may be made to the embodiments described herein, without departing from the scope and spirit of the present disclosure. Similarly, for clarity and conciseness, descriptions of known features and structures are omitted in the following description.

A smart contract is a set of commitments or obligations defined in a programming language, upon which contract participants execute an agreement of these commitments or obligations. The agreement comprises processing logic with a sequence of logic.

A timed smart contract refers to a smart contract with a time trigger function, wherein the smart contract is triggered by means of a combination of time and a timer trigger function in a timing manner. The time trigger function is a time judgment function or a condition function. Whether time information (such as a current time) satisfies the time trigger function is determined by inputting it into the time trigger function, and if so, the execution of the smart contract corresponding to the time trigger function or the execution of a logic in the smart contract corresponding to the time trigger function is triggered.

An oracle machine contract refers to a protocol defined in a programming language, wherein the oracle machine contract may communicate with an external oracle machine and provide time information or a trigger instruction for the connected timed smart contract, and is independent of the oracle machine and deployed on a blockchain.

Figure 1:
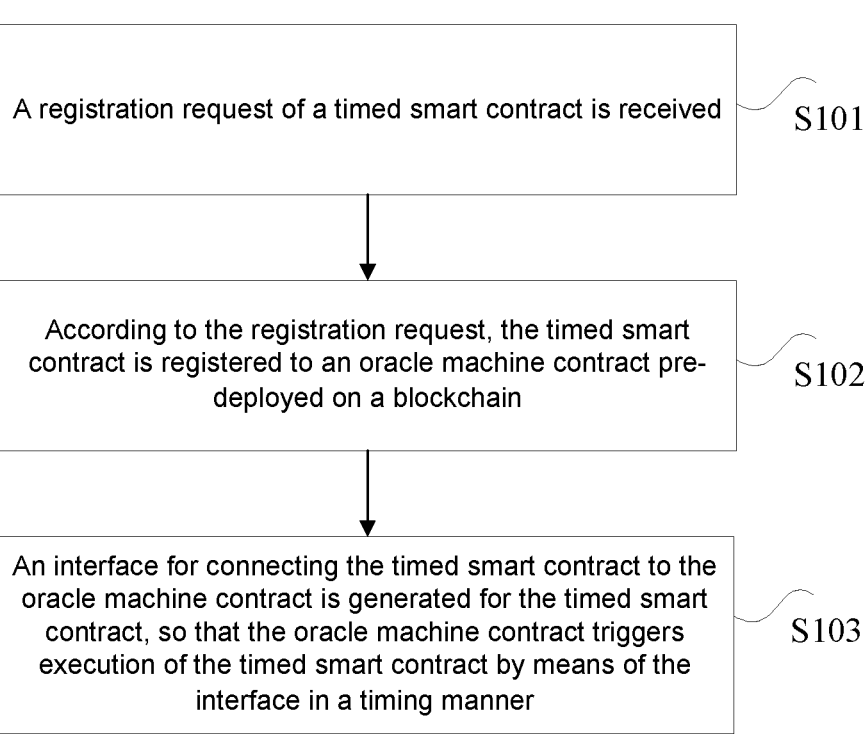
FIG. 1 is a schematic diagram of a main flow of a registration method of a timed smart contract in a blockchain according to an embodiment of the present disclosure.

FIG. 1 is a schematic diagram of a registration method of a timed smart contract in a blockchain according to an embodiment of the present disclosure. As shown in FIG. 1, the registration method of the timed smart contract in the blockchain may include the following steps.

At S101, a registration request of a timed smart contract is received.

At S102, according to the registration request, the timed smart contract is registered to an oracle machine contract pre-deployed on the blockchain.

At S103, an interface for connecting the timed smart contract to the oracle machine contract is generated for the timed smart contract, so that the oracle machine contract triggers execution of the timed smart contract by means of the interface in a timing manner.

The exemplary implementation mode of S101 may be as follows: a corresponding registration initiation logic is provided for the timed smart contract, after the timed smart contract is deployed on the blockchain, the blockchain may send an indication that the deployment is completed to the timed smart contract. The indication that the deployment is completed triggers the execution of the registration initiation logic. In an execution process of the registration initiation logic, the registration request of the timed smart contract is sent, and after the registration is completed, an indication that the registration is successful is also sent to the timed smart contract, so as to terminate the execution of the registration initiation logic.

It is to be noted that one single oracle machine contract may register a plurality of timed smart contracts, so that management of the plurality of timed smart contracts can be achieved by maintaining the one oracle machine contract, and maintenance of the oracle machine contract is facilitated.

The interface for connecting the timed smart contract to the oracle machine contract may be generated for the timed smart contract in two implementation modes: an implementation mode 1 is that: the corresponding interface is generated for each of the plurality of timed smart contracts, and feature identification information of the each timed smart contract, such as a code or number of the timed smart contract, is provided in the interface, so as to trigger the execution of the timed smart contract by means of the interface in a timing manner; and an implementation mode 2 is that: one corresponding interface is generated for the plurality of timed smart contracts, after receiving the registration request of the timed smart contract, the feature identification information of the timed smart contract, such as the code or number of the timed smart contract, is written into the interface, so as to trigger, by means of the interface in a timing manner, the execution of the timed smart contract corresponding to the code or number included in the interface.

There are two implementation modes of timing trigger: one is to send the current time received by the oracle machine contract, and the other is to generate the trigger instruction for the timed smart contract and send the trigger instruction to the corresponding timed smart contract.

In the embodiment shown in FIG. 1, by registering the timed smart contract deployed on the blockchain to the oracle machine contract, the interface for connecting the timed smart contract to the oracle machine contract is generated for the timed smart contract, and the oracle machine contract triggers the execution of the timed smart contract by means of the interface in a timing manner, so as to achieve the management and execution of the timed smart contract by means of the blockchain. In addition, since the registration and execution of the timed smart contract may rely on the oracle machine contract, and the communication with an oracle machine outside the blockchain is performed by means of the oracle machine contract, so that the direct communication between the timed smart contract and the oracle machine outside the blockchain is avoided. At the same time, the communication content between the timed smart contract and the oracle machine contract is relatively simple, so the oracle machine contract is relatively easy to maintain. Moreover, by maintaining the oracle machine contract, the timed smart contract can be effectively prevented from external attacks, and the security of the timed smart contract is guaranteed.

In addition, the execution of the timed smart contract relies on the trust basis of the entire blockchain. Based on this, in the solutions provided by the embodiments of the present disclosure, the blockchain may be a consortium blockchain.

In the embodiments of the present disclosure, there may be two alternative implementation modes of the step of registering the timed smart contract to the oracle machine contract.

Alternative Implementation Mode 1:

The oracle machine contract comprises a first registry.

The registration request specifies a contract feature identification and trigger time information corresponding to the timed smart contract.

The contract feature identification refers to feature information capable of uniquely identifying the timed smart contract, such as a contract number or contract code.

The trigger time information may include: a registration time of the timed smart contract, a time of first execution, a time interval between two adjacent executions, how often to execute once, a daily, weekly or monthly fixed execution time, etc., so as to infer or directly know, by means of the trigger time information, the time of each execution of the timed smart contract.

The step of registering the timed smart contract to the oracle machine contract may include that: the contract feature identification and the trigger time information are correspondingly stored in the first registry, so that the oracle machine contract triggers the timed smart contract according to the trigger time information in a timing manner.

The contract feature identification and the trigger time information are uniformly managed by means of the first registry, so that when the execution of the timed smart contract is subsequently triggered, without sending the current time to all the timed smart contracts, each timed smart contract determines whether it needs to be executed according to the first registry. That is, in the solutions provided in the present application, a timed smart contract to be executed may be determined by means of the contract feature identification and the trigger time information stored in the first registry, and merely the execution of the timed smart contract to be executed needs to be triggered, which effectively saves computing resources.

Alternative Implementation Mode 2:

The oracle machine contract includes a second registry.

The step of registering the timed smart contract to the oracle machine contract may include that: a contract feature identification and a time trigger function corresponding to the timed smart contract are obtained from the timed smart contract; and the contract feature identification and the time trigger function are correspondingly stored in the second registry, so that the oracle machine contract triggers, according to the time trigger function in a timed manner, the timed smart contract.

By storing the time trigger function in the second registry, in the subsequent process of determining whether the timed smart contract needs to be executed, the current time is directly substituted into the time trigger function stored in the second registry, and it is determined that the timed smart contract corresponding to the time trigger function that the current time satisfies needs to be executed, so that the oracle machine contract triggers the execution of the timed smart contract corresponding to the time trigger function that the current time satisfies. That is, the step of determining whether the timed smart contract needs to be executed is converted from each timed smart contract determining whether it needs to be executed according to the current time into determining the time trigger function satisfying the current time in the second registry, and then determining the timed smart contract corresponding to the time trigger function satisfying the current time as the timed smart contract to be executed, so as to achieve a unified determination on the plurality of timed smart contracts.

The above two alternative implementation modes may coexist, and when the timed smart contract is registered, the selection of the alternative implementation mode may be predefined by means of the registration request, so as to meet the requirements of different users. In addition, the alternative implementation mode 1 is selected for a timed smart contract with relatively single trigger time information (such as a fixed time point every day, execution every seven days, and a fixed time every month) to register the timed smart contract to the oracle machine contract. The alternative implementation mode 2 is selected for a timed smart contract with complex trigger time information (such as every specified time, a time satisfying a specified condition such as an even number of dates) to register the timed smart contract to the oracle machine contract.

In the embodiments of the present disclosure, the registration request further specifies logic feature identifiers corresponding to a plurality of processing logics included in the timed smart contract. The trigger time information includes: logic trigger time information corresponding to each of the processing logics.

Accordingly, the step of correspondingly storing the contract feature identification and the trigger time information in the first registry may include that: the contract feature identification, each of the logic feature identifications, and the logic trigger time information corresponding to each of the plurality of processing logics are correspondingly stored in the first registry, so that the oracle machine contract triggers, according to the logic trigger time information in a timing manner, the corresponding processing logic. Through this process, the management of the processing logic in the timed smart contract is achieved, so that the processing logic in the timed smart contract is also executed in a timed manner, which further enriches the types of the timed smart contracts executed by the blockchain.

Figure 2:
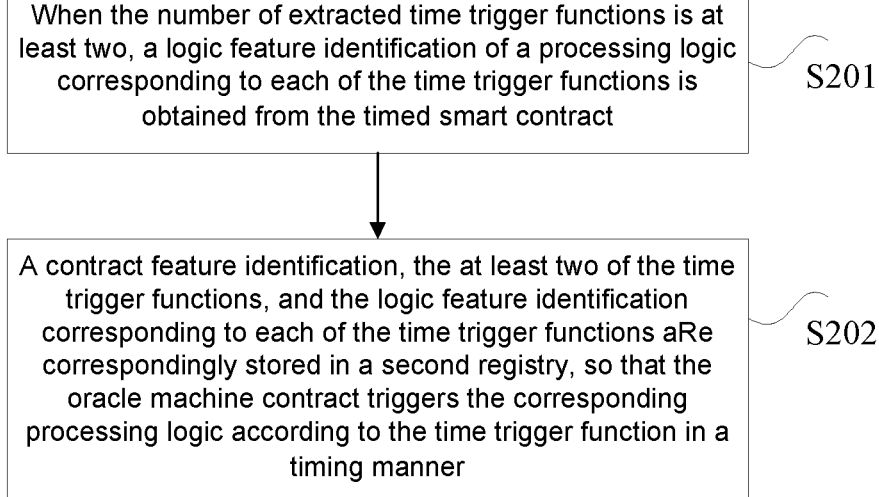
FIG. 2 is a schematic diagram of a main flow of registering a timed smart contract to an oracle machine contract according to an embodiment of the present disclosure.

In the embodiments of the present disclosure, as shown in FIG. 2, the step of registering the timed smart contract to the oracle machine contract may further include the following steps.

At S201, when the number of the extracted time trigger functions is at least two, the logic feature identification of the processing logic corresponding to each of the time trigger functions is obtained from the timed smart contract.

At S202, the contract feature identification, the at least two of the time trigger functions, and the logic feature identification corresponding to each of the time trigger functions are correspondingly stored in the second registry, so that the oracle machine contract triggers, according to the time trigger function in a timing manner, the corresponding processing logic.

Through this process, the management of the time trigger function corresponding to the processing logic in the timed smart contract is achieved, so that the processing logic in the timed smart contract is also executed in a timing manner, which further enriches the types of the timed smart contracts executed by the blockchain.

In the embodiments of the present disclosure, differentiated management of the timed smart contract and smart contracts other than the timed smart contract is achieved.

For a non-timed smart contract, the registration method of the timed smart contract in the blockchain may further include that: a corresponding transaction block is generated for the non-timed smart contract, and a transaction corresponding to the non-timed smart contract is recorded in the transaction block. The non-timed smart contract is a smart contract without an event trigger function, so that the non-timed smart contract is executed based on the transaction block.

The non-timed smart contract refers to a smart contract that does not have a timing trigger function and does not need to be executed in a timing manner. In a preferred embodiment, the non-timed smart contract is a smart contract that needs to be triggered by a service outside the blockchain.

For the timed smart contract, as shown in FIG. 3, the registration method of the timed smart contract in the blockchain may further include the following steps.

At S301, a corresponding built-in block or a built-in area located in the transaction block is generated for the timed smart contract.

At S302, a corresponding amount of consumable resources is configured for the built-in block or the built-in area located in the transaction block, and a transaction corresponding to the timed smart contract is recorded in the transaction block, so that the timed smart contract receiving a trigger is executed based on the built-in block or the built-in area located in the transaction block.

The amount of consumable resources refers to an amount of resources that may be currently provided by a contracting party executing a first smart contract.

The amount of resources currently required refers to an amount of resources that the contracting party of the first smart contract needs to pay for the execution of the first smart contract.

The corresponding amount of consumable resources is configured for the built-in block or the built-in area, so that the execution of the first smart contract is forced to stop when the amount of resources is greater than the amount of consumable resources, thereby avoiding the problems of downtime caused by an infinite loop, etc.

It is to be understood that at least one transaction block must first be present when the built-in area located in the transaction block is generated for the timed smart contract. The transaction block may be the transaction block corresponding to the non-timed smart contract, or the transaction block generated for the timed smart contract. The built-in area is divided into the transaction block, and the corresponding amount of consumable resources is configured for the built-in area.

For the transaction block generated for the timed smart contract, the built-in area is divided in the transaction block, and the transaction block corresponding to the timed smart contract is configured to record a transaction record of the timed smart contract. Before executing the timed smart contract, whether the amount of resources currently required is less than the corresponding amount of consumable resources of the built-in area is determined first, if so, the timed smart contract is executed, and the transaction of the timed smart contract is recorded in the transaction block outside the built-in area, so that a recording area of the transaction record is separated from the built-in area so as to facilitate the management of the transaction record.

As shown in FIG. 4, the embodiments of the present disclosure provide an execution method of a timed smart contract in a blockchain, which may include the following steps.

At S401, a current time is received by means of an oracle machine contract. At least one timed smart contract is registered on the oracle machine contract.

In this step, the current time may be received once every few seconds, several tens of seconds, several tens of milliseconds or every minute, etc. to ensure that the current time is updated in a timing manner, thereby effectively improving the accuracy of the subsequent timed execution.

At S402, the current time is matched with registration information of the registered timed smart contract.

At S403, according to a matching result, at least one timed smart contract to be executed is determined.

At S404, execution of the timed smart contract to be executed is triggered by means of the oracle machine contract.

The registration information refers to the information registered in the oracle machine contract, and may include: a contract feature identification, a registration time of the timed smart contract, a time of first execution, a time interval between two adjacent executions, how often to execute once, a daily, weekly or monthly fixed execution time, a time trigger function included in the timed smart contract, etc.

The execution of the timed smart contract to be executed is triggered by means of the oracle machine contract in two manners: one is to directly send the current time to the timed smart contract to be executed, and the other is to generate a trigger instruction and send the trigger instruction to the timed smart contract to be executed. The executable timed smart contract starts to execute after receiving the trigger instruction.

In the embodiment shown in FIG. 4, by registering the timed smart contract deployed on the blockchain to the oracle machine contract, the interface for connecting the timed smart contract to the oracle machine contract is generated for the timed smart contract, and the oracle machine contract triggers the execution of the timed smart contract by means of the interface in a timing manner, so as to achieve the management and execution of the timed smart contract by means of the blockchain. In addition, since the registration and execution of the timed smart contract may rely on the oracle machine contract, and the communication with an oracle machine outside the blockchain is performed by means of the oracle machine contract, the direct communication between the timed smart contract and the oracle machine outside the blockchain is avoided. At the same time, so that the communication content between the timed smart contract and the oracle machine contract is relatively simple, so that the oracle machine contract is relatively easy to maintain. Moreover, by maintaining the oracle machine contract, the timed smart contract can be effectively prevented from external attacks, and the security of the timed smart contract is guaranteed.

It is to be noted that the execution of the timed smart contract is based on the trust basis of the entire blockchain. Based on this, in the execution solution of the timed smart contract provided by the embodiments of the present disclosure, the blockchain may be a consortium blockchain.

In the embodiments of the present disclosure, the oracle machine contract communicates with a plurality of oracle machines outside the blockchain. Therefore, the alternative implementation mode of S401 may be that: the current time sent by the oracle machine is received, or a current time of a node on the blockchain is received. The current time sent by the oracle machine is received to ensure that the execution of the timed smart contract is completed according to an out-of-chain time, so as to better satisfy the needs of users.

In order to avoid the plurality of oracle machines repeatedly sending the current time, the execution method of the timed smart contract in the blockchain further includes that: a trusted oracle machine is voted from the plurality of oracle machines. Accordingly, the step of determining the current time by means of the oracle machine contract includes that: the current time sent by the trusted oracle machine is received by means of the oracle machine contract.

In the embodiments of the present disclosure, the trusted oracle machine is voted in two manners.

The first manner of voting the trusted oracle machine is as follows.

The trusted oracle machine is determined from the plurality of oracle machines by adopting a polling manner. The polling manner may be polling according to a specified order, or random polling.

For example, the plurality of oracle machines are an oracle machine a, an oracle machine b, an oracle machine c, and an oracle machine d respectively, polling according to a specified order may be polling according to the order of the oracle machine a, the oracle machine b, the oracle machine c, and the oracle machine d respectively. For example, the current trusted oracle machine is the oracle machine b, and after the duration of using the oracle machine b as the trusted oracle machine reaches a specified duration, the oracle machine c is used as the trusted oracle machine.

For another example, the plurality of oracle machines are the oracle machine a, the oracle machine b, the oracle machine c, and the oracle machine d respectively, according to random polling, the current trusted oracle machine is the oracle machine b, and after the duration of using the oracle machine b as the trusted oracle machine reaches a specified duration, the oracle machine d is randomly selected as the trusted oracle machine.

The second manner of voting the trusted oracle machine is as follows.

The trusted oracle machine is selected from the plurality of oracle machines by adopting a voting manner. The voting manner may be performed periodically, such as every month, every week, or every 5 days.

There are two Alternative voting manners.

The first voting manner is that: the oracle machine is preliminarily screened out from the plurality of oracle machines, for a consortium blockchain or a private blockchain, each node included in the consortium blockchain or the private blockchain votes on the preliminarily screened oracle machine, and when a voting ratio (the voting ratio: the number of nodes voting for or agreeing with divided by the total number of nodes included in the consortium blockchain or the private blockchain) is not lower than a preset ratio threshold, the preliminarily screened oracle machine is determined as the trusted oracle machine; and for the public blockchain, a plurality of trusted nodes included in the public blockchain vote on the preliminarily screened oracle machine, and when a voting ratio (the voting ratio: the number of nodes voting for or agreeing for divided by the total number of trusted nodes included in the public blockchain) is not less than a preset ratio threshold, the preliminarily screened oracle machine is determined to be the trusted oracle machine. The voting ratio is adjusted accordingly according to the actual situation, and the voting ratio more realistically reflects the true situation of voting. The trusted oracle machine is selected quickly and accurately by means of the first voting manner, and the credibility of the trusted oracle machine is guaranteed to a specified extent. In this way, the information security of the blockchain is effectively improved by means of the communication between the trusted oracle machine and the blockchain.

The second voting manner is as follows.

For each node included in the consortium blockchain or the private blockchain or each trusted node in the public blockchain, the following operations are respectively executed: at least one preliminarily screened oracle machine is selected from the plurality of oracle machines, and then the number of affirmative (approval) votes of each preliminarily screened oracle machine is counted. Based on a preliminary voting result, the form of further screening the trusted oracle machine may include the following operations.

1. The preliminarily screened oracle machine with the largest number of affirmative votes is directly selected as the trusted oracle machine. If there are at least two oracle machines with the largest number of affirmative votes, one is randomly selected from the at least two oracle machines or the oracle machine with the least number of negative votes is selected as the trusted oracle machine.

For example, the nodes participating in voting are a node 1, a node 2, a node 6, a node 8, and a node 9 respectively, and the plurality of oracle machines are the oracle machine a, the oracle machine b, the oracle machine c, and the oracle machine d respectively, the node 1 votes for the oracle machine a and the oracle machine b, the node 2 votes for the oracle machine a and the oracle machine c, the node 6 votes for the oracle machine a and the oracle machine d, the node 8 votes for the oracle machine a and the oracle machine d, the node 9 votes for the oracle machine a and the oracle machine c, and then the oracle machine a has the largest number of affirmative votes, and is used as the trusted oracle machine.

2. The preliminarily screened oracle machines without the negative vote are determined, and the preliminarily screened oracle machine with the largest number of votes is selected from the preliminarily screened oracle machines without the negative vote as the trusted oracle machine.

For example, the plurality of oracle machines are the oracle machine a, the oracle machine b, the oracle machine c, and the oracle machine d respectively, the preliminarily screened oracle machines without the negative vote are the oracle machine a, the oracle machine b, and the oracle machine c, and the oracle machine a has the largest number of affirmative votes, so that the oracle machine a is selected as the trusted oracle machine.

3. The preliminarily screened oracle machine without the negative vote, or the preliminarily screened oracle machine with the number of affirmative votes not lower than a preset threshold, or the preliminarily screened oracle machine with the largest number of affirmative votes is re-voted, and the trusted oracle machine is determined according to a re-voting result.

There are three screening forms for the second voting manner, and the user makes a corresponding selection as needed, so as to select the trusted oracle machine flexibly, prevent the outside from locating the trusted oracle machine by voting, and ensure the security of the trusted oracle machine to a specified extent.

In order to further ensure the accuracy of the current time received by the oracle machine contract, in the embodiments of the present disclosure, as shown in FIG. 5, the execution method of the timed smart contract in the blockchain may further include the following steps.

At S501, a log is generated, and the current time received by the oracle machine contract is recorded in the log.

At S502, when a lookup request of a trusted node or other trusted oracle machines in the blockchain is received, the log is provided for the trusted node or other trusted oracle machines.

The trusted node refers to a node on the blockchain which is given the log lookup permission by the oracle machine contract, for example, for the consortium blockchain, the trusted node is all the nodes on the consortium blockchain. Other trusted oracle machines are oracle machines that are voted by the above voting manners and given the log lookup permission by the oracle machine. For example, other trusted oracle machines may be the remaining oracle machines of the plurality of oracle machines other than the above trusted oracle machine providing the current time for the oracle machine contract.

The alternative implementation mode of providing the log for the trusted node or other trusted oracle machines is that the last piece of information recorded in the log is provided for the trusted node or other trusted oracle machines, the last piece of information including the last recorded current time.

At S503, whether the current time recorded in the log is accurate is verified according to a lookup result. If so, S504 is executed. If not, S505 is executed.

The trusted node or other trusted oracle machines mainly compare the last piece of time information recorded in the log with the current time of its own device, and when a comparison result is that a difference between the current time included in the last piece of information recorded in the log and the current time of its own device is not greater than a preset time difference threshold, it is determined that the current time included in the last piece of information is matched with the time of the trusted node or other trusted oracle machines. Accordingly, the lookup result may include: the total number of trusted nodes or other trusted oracle machines participating in log lookup, the number of trusted nodes or other trusted oracle machines matched with the last piece of time information recorded in the log, etc.

The operation of verifying whether the time information recorded in the log is accurate may be that: whether the number of trusted nodes or other trusted oracle machines matched with the current time included in the last piece of information recorded in the log is the same as the total number of trusted nodes or other trusted oracle machines participating in the log lookup, and if so, it is determined that the time information is accurate.

The operation of verifying whether the time information recorded in the log is accurate may also be that: whether the number of trusted nodes or other trusted oracle machines matched with the current time included in the last piece of information recorded in the log is not less than a preset number threshold, and if so, it is determined that the time information is accurate.

At S504, a current flow is terminated.

At S505, the trusted oracle machine is marked as being un-trusted, and the step of voting the trusted oracle machine from the plurality of oracle machines is re-executed.

Through the above process, the time information provided by the trusted oracle machine is checked to ensure the reliability of the trusted oracle machine and the time information, thereby ensuring the reliability of the execution of the timed smart contract.

The alternative implementation mode of S402 may select different matching manners based on different registration manners of the timed smart contract.

For a case where the contract feature identification and the trigger time information of the timed smart contract are registered in the first registration, the alternative implementation modes of S402 and S403 are as follows.

At least one target trigger time consistent with the current time is found in the first registration. Accordingly, the alternative implementation mode of S403 includes that: a corresponding target contract feature identification is matched for each of the target trigger times; and the timed smart contract to be executed is determined according to the target contract feature identification.

For example, the first registration includes: a contract feature identification 1 and corresponding trigger time information (such as 3 p. m. per day), a contract feature identification 2 and corresponding trigger time information (such as 3 p. m. from Monday to Friday), a contract feature identification 3 and corresponding trigger time information (such as the $10^{th}$ of every month), etc. For example, if the current time is 3 p. m. on Wednesday, February $2^{nd}$, the current time is matched with the 3 p. m. per day and the 3 p. m. from Monday to Friday, that is, the 3 p. m. per day and the 3 p. m. from Monday to Friday are the target trigger time. Accordingly, the target contract feature identifications are the contract feature identification 1 and the contract feature identification 2, and then the timed smart contract corresponding to the contract feature identification 1 and the timed smart contract corresponding to contract feature identification 2 are the timed smart contracts to be executed.

For a case where the contract feature identification and the time trigger function of the timed smart contract are registered in the second registry, the alternative implementation mode of S402 may include the following operation.

At least one target time trigger function that the current time satisfies is found in the second registry.

Accordingly, the alternative implementation mode of S403 may include that: a corresponding target contract feature identification is matched for each of the target time trigger functions; and the timed smart contract corresponding to the target contract feature identification is determined as the timed smart contract to be executed.

The current time satisfies the time trigger function means that after the current time is added to the time trigger function, the condition corresponding to the time trigger function is satisfied. For example, the time trigger function is: 0.9 h$\leq$T$_{n}$−T$_{n-1}\leq$1.15 h, where T$_{n}$ represents the current time, and T$_{n-1}$ represents the execution time of the last execution of the first smart contract; 0.9 h represents 0.9 hour, 1 h represents 1 hour, and greater than or equal to 0.9 h and less than or equal to 1.15 h is a limiting condition corresponding to the time trigger function. Assuming that the execution time of the last execution of the timed smart contract is 2020.5.20/10:00, and the current time is 2020.5.20/10:30, the current time does not satisfy the time trigger function 0.9 h$\leq$T$_{n}$−T$_{n-1}\leq$1.15 h. Assuming that the execution time of the last execution of the timed smart contract is 2020.5.20/10:00 and the current time is 2020.5.20/11:00, the current time satisfies the time trigger function 0.9 h$\leq$T$_{n}$−T$_{n-1}\leq$1.15 h. The current time is also obtained by multiplying the block height of the recorded block by an average time interval at which each block is generated.

$$f_1 - \theta \le \frac{T_n - T}{K - 1} \le f_1 + \theta,$$

For another example, the time trigger function is: where T$_{n}$ represents the current time, and T represents the execution time of the first execution of the timed smart contract; f$_1$ represents the time difference between two adjacent executions, θ represents a defined allowable error of the time difference, and K represents the number of executions of the timed smart contract corresponding to the time trigger function, and accordingly, the limiting condition corresponding to the time trigger function is: greater than or equal to f$_1$−θ and less than or equal to f$_1$−θ. The smart contract may also be triggered by means of the time trigger function in a timing manner.

Thus, in the solutions provided by the embodiments of the present disclosure, the time trigger function is any function that achieves timing, and the execution of the corresponding timed smart contract or the processing logic in the timed smart contract is triggered by means of timing.

Through the above process, the timed smart contract to be executed is determined by the oracle machine contract, merely the execution of the timed smart contract to be executed needs to be triggered subsequently, and each timed smart contract does not need to determine whether it needs to be executed, which effectively reduces the consumption of computing resources.

In addition, since the timed smart contract obtains the current time by means of the oracle machine contract deployed on the blockchain, that is, the timed smart contract does not directly interact with the outside, attacking information is effectively avoided from attacking the timed smart contract by defining the information which may be transmitted by the interface (connecting the oracle machine contract to the timed smart contract). In addition, since one oracle machine contract may be connected to the plurality of timed smart contracts, and the function of the oracle machine contract is relatively simple, the user maintains the oracle machine contract conveniently.

In addition, when the time trigger function is the condition function shown in the above embodiment, and the plurality of current times successively received by the oracle machine contract may satisfy the above time trigger function, in order to avoid repeated executions of the timed smart contract to be executed within the range of the condition limited by the time trigger function, for each timed smart contract in execution or completed execution, an identifier corresponding to each execution or an identifier corresponding to the completion of each execution is fed back to a timed oracle machine contract. Accordingly, the timed oracle machine contract further determines whether to trigger the timed smart contract to be executed according to the identifier corresponding to the execution or the identifier corresponding to the completion of the execution.

In the embodiments of the present disclosure, each of the plurality of processing logics in the timed smart contract includes the corresponding time trigger function, and the contract feature identification of the timed smart contract, the logic feature identifications corresponding to the plurality of processing logics included in the timed smart contract, and the logic trigger time information corresponding to each of the processing logics are stored in the first registry. The alternative implementation mode of S402 may include the following operations.

At least one piece of target logic trigger time information consistent with the current time is found. The corresponding target contract feature identification and a target logic feature identification are matched for each piece of the target logic trigger time information. For example, if the current time satisfies logic trigger time information 1 and logic trigger time information 2 stored in the first registry, the logic trigger time information 1 and the logic trigger time information 2 are both the target logic trigger time information. The contract feature identifications and the logic feature identification respectively corresponding to the logic trigger time information 1 and the logic trigger time information 2 are the target contract feature identifications and the target logic feature identification.

Accordingly, after determining the timed smart contract to be executed, the method further includes that: a processing logic to be executed in the timed smart contract to be executed is determined according to the target logic feature identification; and the execution of the processing logic to be executed in the timed smart contract to be executed is triggered by means of the oracle machine contract.

For example, if the target contract feature identification corresponds to a timed smart contract 1 and the target logic feature identification corresponds to a processing logic 1, the processing logic 1 in the timed smart contract 1 is executed, and then, it is to be understood that, based on the processing logic 1, the processing logic related to the processing logic 1 is executed according to the agreed processing logic in the timed smart contract. Through the above process, the logic in the smart contract is executed in segments to satisfy more complex and varied requirements of the smart contract.

In the embodiments of the present disclosure, each of the plurality of processing logics in the timed smart contract includes the corresponding time trigger function, and the contract feature identification of the timed smart contract, the logic feature identifications corresponding to the plurality of processing logics included in the timed smart contract, and the time trigger function corresponding to each of the processing logics are stored in the second registry. The alternative implementation mode of S402 may include the following operation.

At least one target time trigger function that the current time satisfies is found in the second registry; and the corresponding target contract feature identification and a target logic feature identification are matched for each of the target time trigger functions.

Accordingly, after determining the timed smart contract to be executed, the method further includes that: the processing logic to be executed in the timed smart contract to be executed is determined according to the target logic feature identification; and the execution of the processing logic to be executed in the timed smart contract to be executed is triggered by means of the oracle machine contract.

For example, if the current time satisfies a time trigger function 1 and a time trigger function 2, then the time trigger function 1 and the time trigger function 2 are the target time trigger functions. The time trigger function 1 corresponds to the processing logic 1 in the timed smart contract 1, and the time trigger function 2 corresponds to a processing logic 2 in the timed smart contract 1 and a processing logic 3 in a timed smart contract 2. The target contract feature identifications are the contract feature identification corresponding to the timed smart contract 1 and the contract feature identification corresponding to the timed smart contract 2. The target logic feature identifications are the logic feature identification of the processing logic 1 and the logic feature identification of the processing logic 2 in the timed smart contract 1, and the logic feature identification of the processing logic 3 in the timed smart contract 2. Through the above process, the logic in the smart contract is executed in segments to satisfy more complex and varied requirements of the smart contract.

In addition, when the time trigger function is the condition function shown in the above embodiment, and the plurality of current times successively received by the oracle machine contract may satisfy the above time trigger function, in order to avoid repeated executions of the processing logic to be executed within the range of the condition limited by the time trigger function, for each timed smart contract in execution or completed execution, the identifier corresponding to each execution or the identifier corresponding to the completion of each execution is fed back to a timed oracle machine contract. Accordingly, the timed oracle machine contract further determines whether to trigger the processing logic to be executed according to the identifier corresponding to the execution or the identifier corresponding to the completion of the execution.

In the embodiments of the present disclosure, different types of smart contracts (the timed smart contract and the non-timed smart contract) respectively have different execution modes, so that the non-timed smart contract is executed according to the original execution mode. The corresponding execution mode is provided for the timed smart contract separately by adding the corresponding execution mode of the timed smart contract on the basis of the existing blockchain, which effectively simplifies a construction process of the execution mode of the smart contract in the blockchain, thereby saving the construction cost of the execution mode of the smart contract in the blockchain.

For the execution of the non-timed smart contract:

As shown in FIG. 6, the execution method of the timed smart contract in the blockchain may further include the following steps.

At S601, a transaction block is provided for the non-timed smart contract. A transaction corresponding to the non-timed smart contract is recorded in the transaction block.

At S602, when an execution trigger of the non-timed smart contract is received, the transaction block corresponding to the non-timed smart contract is executed.

The definition of the non-timed smart contract is consistent with that of the non-timed smart contract mentioned in the above registration method, and will not be elaborated here.

For the execution of the timed smart contract:

As shown in FIG. 7, the execution method of the timed smart contract in the blockchain may further include the following steps.

At S701, a built-in block or a built-in area located in the transaction block is provided for the timed smart contract, and a corresponding amount of consumable resources is configured for the built-in block or the built-in area. A transaction of the timed smart contract is recorded in the built-in block or the built-in area.

At S702, the execution of the timed smart contract to be executed is triggered by means of the oracle machine contract.

At S703, whether an amount of resources currently required is not larger than the amount of consumable resources corresponding to the built-in block or the built-in area is determined. If so, S704 is executed. If not, S705 is executed.

At S704, the built-in block or the built-in area corresponding to the timed smart contract is executed, and a current flow is terminated.

At S705, the execution is prohibited.

The amount of consumable resources refers to an amount of resources that may be currently provided by a contracting party executing the timed smart contract.

The amount of resources currently required refers to an amount of resources that the contracting party of the timed smart contract needs to pay for the execution of the timed smart contract.

For example, if the current smart contract is the non-timed smart contract (a smart contract executed by an external trigger outside the blockchain), the current smart contract is executed according to the embodiment shown in FIG. 6. If the current smart contract is the timed smart contract, the current smart contract is executed according to the embodiment shown in FIG. 7.

By means of the embodiments of FIGS. 6 and 7, differentiated execution of the non-timed smart contracts and the timed smart contracts is achieved. When the timed smart contract is executed by means of the embodiment of FIG. 7, and the built-in block or the built-in area is configured with the corresponding amount of consumable resources, so that the execution of the timed smart contract is forced to stop when the amount of resources is higher than the amount of consumable resources, thereby avoiding the problems of downtime caused by an infinite loop, etc.

As shown in FIG. 8, the embodiments of the present disclosure provide a registration apparatus 800 of a timed smart contract in a blockchain, the registration apparatus 800 of the timed smart contract in the blockchain may include: a receiving unit 801 and a registration unit 802.

The receiving unit 801 is configured to receive a registration request of a timed smart contract.

The registration unit 802 is configured to register, according to the registration request received by the receiving unit 801, the timed smart contract to an oracle machine contract pre-deployed on the blockchain; and generate, for the timed smart contract, an interface for connecting the timed smart contract to the oracle machine contract, so that the oracle machine contract triggers execution of the timed smart contract by means of the interface in a timing manner.

In the embodiments of the present disclosure, the oracle machine contract includes a first registry. The registration request specifies a contract feature identification and trigger time information corresponding to the timed smart contract.

Accordingly, the registration unit 802 is configured to correspondingly store the contract feature identification and the trigger time information in the first registry, so that the oracle machine contract triggers the timed smart contract according to the trigger time information in a timing manner.

In the embodiments of the present disclosure, the oracle machine contract further includes a second registry.

Accordingly, the registration unit 802 is configured to obtain a contract feature identification and a time trigger function corresponding to the timed smart contract from the timed smart contract; and correspondingly store the contract feature identification and the time trigger function in the second registry, so that the oracle machine contract triggers, according to the time trigger function in a timing manner, the timed smart contract.

In the embodiments of the present disclosure, the registration request further specifies logic feature identifications corresponding to a plurality of processing logics included in the timed smart contract. The trigger time information includes: logic trigger time information corresponding to each of the processing logics.

Accordingly, the registration unit 802 is further configured to correspondingly store the contract feature identification, each of the logic feature identifications, and the logic trigger time information corresponding to each of the processing logics in the first registry, so that the oracle machine contract triggers, according to the logic trigger time information in a timing manner, the corresponding processing logic.

In the embodiments of the present disclosure, the registration unit 802 is further configured to obtain, when the number of the extracted time trigger functions is at least two, the logic feature identification of the processing logic corresponding to each of the time trigger functions from the timed smart contract; and correspondingly store the contract feature identification, the at least two of the time trigger functions, and the logic feature identification corresponding to each of the time trigger functions in the second registry, so that the oracle machine contract triggers, according to the time trigger function in a timing manner, the corresponding processing logic.

In the embodiments of the present disclosure, the registration unit 802 is further configured to generate a corresponding transaction block for a non-timed smart contract, and record a transaction corresponding to the non-timed smart contract in the transaction block. The non-timed smart contract is a smart contract without an event trigger function, so that the non-timed smart contract is executed based on the transaction block.

In the embodiments of the present disclosure, the registration unit 802 is further configured to generate a corresponding built-in block or a built-in area located in the transaction block for the timed smart contract; and configure a corresponding amount of consumable resources for the built-in block or the built-in area located in the transaction block, and record a transaction corresponding to the timed smart contract in the transaction block, so that the timed smart contract receiving a trigger is executed based on the built-in block or the built-in area located in the transaction block.

Figure 9:
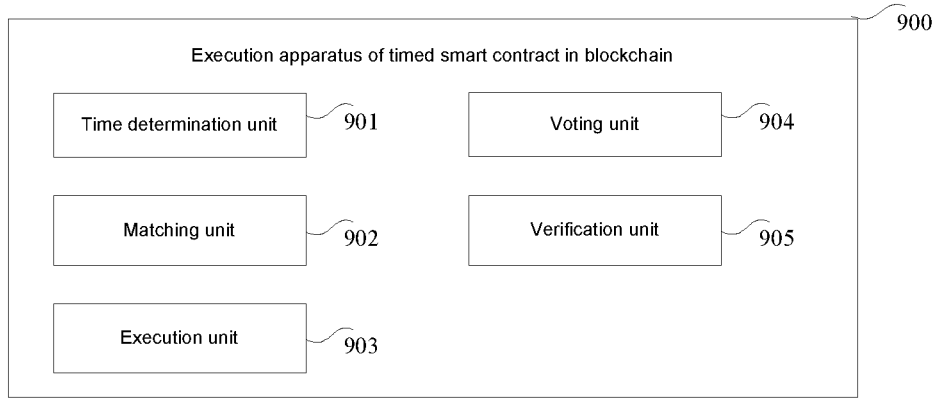
FIG. 9 is a schematic diagram of main units of an execution apparatus of a timed smart contract in a blockchain according to an embodiment of the present disclosure.

As shown in FIG. 9, the embodiments of the present disclosure provide an execution apparatus 900 of a timed smart contract in a blockchain, wherein the execution apparatus 900 of the timed smart contract in the blockchain may include: a time determination unit 901, a matching unit 902, and an execution unit 903.

The time determination unit 901 is configured to receive, by means of an oracle machine contract, a current time. At least one timed smart contract is registered on the oracle machine contract.

The matching unit 902 is configured to match the current time determined by the time determination unit with the registered timed smart contract.

The execution unit 903 is configured to determine, according to a matching result of the matching unit, at least one timed smart contract to be executed; and trigger, by means of the oracle machine contract, execution of the timed smart contract to be executed.

In the embodiments of the present disclosure, as shown in FIG. 9, the execution apparatus 900 of the timed smart contract in the blockchain may further include: a voting unit 904.

The voting unit 904 is configured to vote for a trusted oracle machine from a plurality of oracle machines.

The time determination unit 901 is configured to receive, by means of the oracle machine contract, the current time sent by the trusted oracle machine.

In the embodiments of the present disclosure, the voting unit 904 is configured to determine the trusted oracle machine from the plurality of oracle machines by adopting a polling manner.

In the embodiments of the present disclosure, the voting unit 904 is further configured to select the oracle machine with a voting ratio not lower than a preset ratio threshold from the plurality of oracle machines as the trusted oracle machine by adopting a voting manner.

In the embodiments of the present disclosure, as shown in FIG. 9, the execution apparatus 900 of the timed smart contract in the blockchain may further include: a verification unit 905.

The verification unit 905 is configured to generate a log, and record the current time received by the oracle machine contract in the log; provide, when a lookup request of a trusted node or other trusted oracle machines in the blockchain is received, provide the log for the trusted node or other trusted oracle machines; and verify whether the current time recorded in the log is accurate according to a lookup result, if not, mark the trusted oracle machine as un-trusted, and trigger the voting unit.

The voting unit 904 is further configured to re-execute the step of voting the trusted oracle machine from the plurality of oracle machines when receiving a trigger of the verification unit 905.

In the embodiments of the present disclosure, a contract feature identification corresponding to the timed smart contract and a corresponding trigger time are stored in a first registry included in the oracle machine contract.

Accordingly, the matching unit 902 is configured to find at least one target trigger time consistent with the current time in the first registry.

The execution unit 903 is configured to match a corresponding target contract feature identification for each of the target trigger times found by the matching unit 902; and determine, according to the target contract feature identification, the timed smart contract to be executed.

In the embodiments of the present disclosure, a contract feature identification and a corresponding time trigger function corresponding to the timed smart contract are stored in a second registry included in the oracle machine contract.

Accordingly, the matching unit 902 is further configured to find at least one target time trigger function that the current time satisfies in the second registry.

The execution unit 903 is further configured to match a corresponding target contract feature identification for each of the target time trigger functions found by the matching unit 902; and determine a timed smart contract corresponding to the target contract feature identification as the timed smart contract to be executed.

In the embodiments of the present disclosure, logic feature identifications corresponding to the plurality of processing logics and the logic trigger time information corresponding to each of the processing logics included in the timed smart contract are further stored in the first registry.

Accordingly, the matching unit 902 is further configured to find at least one piece of target logic trigger time information consistent with the current time; and match the corresponding target contract feature identification and a target logic feature identification for each piece of the target logic trigger time information.

In the embodiments of the present disclosure, the logic feature identifications corresponding to the plurality of processing logics and the time trigger function corresponding to each of the processing logics included in the timed smart contract are further stored in the second registry.

Accordingly, the matching unit 902 is further configured to find at least one target time trigger function that the current time satisfies in the second registry; and match the corresponding target contract feature identification and the target logic feature identification for each of the target time trigger functions.

In the embodiments of the present disclosure, the execution unit 903 is configured to determine a processing logic to be executed in the timed smart contract to be executed according to the target contract feature identification and the target logic feature identification; and trigger, by means of the oracle machine contract, the processing logic to be executed in the timed smart contract to be executed, so that the processing logic to be executed is executed.

In the embodiments of the present disclosure, the execution unit 903 is further configured to provide a transaction block for a non-timed smart contract without a timing trigger function, wherein a transaction corresponding to the non-timed smart contract being recorded in the transaction block; and execute, when an execution trigger of the non-timed smart contract is received, the transaction block corresponding to the non-timed smart contract.

In the embodiments of the present disclosure, the execution unit 903 is further configured to provide a built-in block or a built-in area located in the transaction block for the timed smart contract, and to configure a corresponding amount of consumable resources for the built-in block or the built-in area, wherein a transaction of the timed smart contract being recorded in the built-in block or the built-in area; and to determine whether an amount of resources currently required is not larger than the amount of consumable resources corresponding to the built-in block or the built-in area, if so, execute the built-in block or the built-in area corresponding to the timed smart contract, and if not, prohibit the execution.

The registration apparatus 800 of the timed smart contract in the blockchain may be part of the execution apparatus 900 of the timed smart contract in the blockchain.

Figure 10:
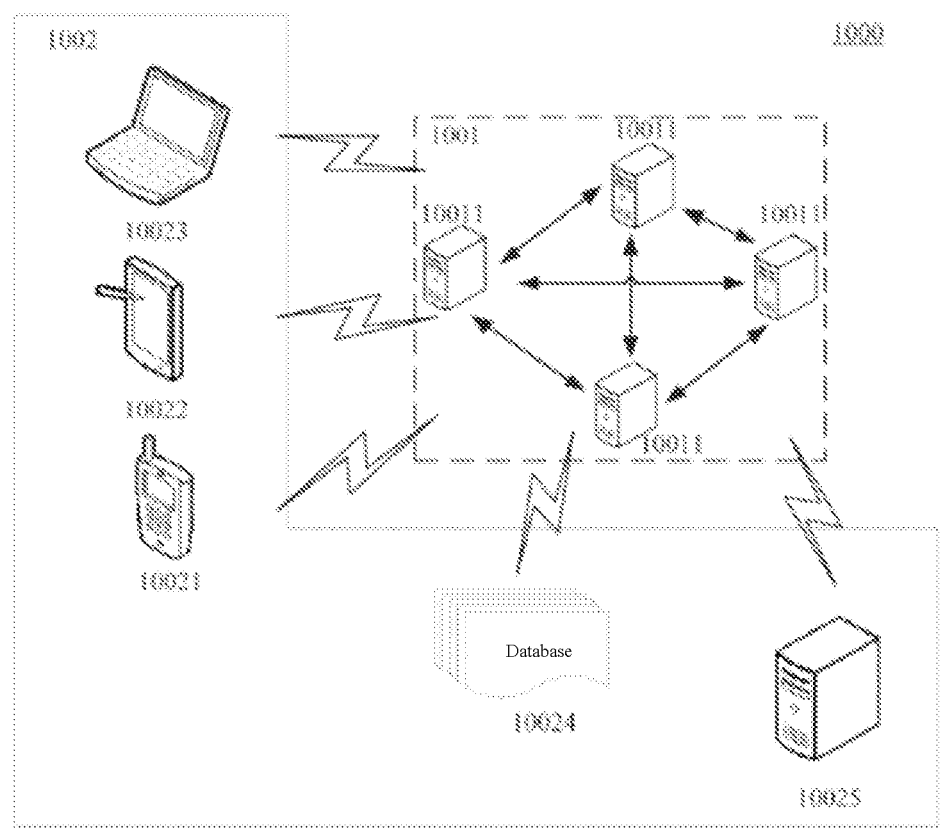
FIG. 10 is a diagram of an exemplary system architecture in which an embodiment of the present disclosure may be applied.

FIG. 10 shows an exemplary system architecture 1000 in which the registration method of the timed smart contract in the blockchain or the registration apparatus of the timed smart contract in the blockchain or the execution method of the timed smart contract in the blockchain or the execution apparatus of the timed smart contract in the blockchain of the embodiments of the present disclosure may be applied.

As shown in FIG. 10, the system architecture 1000 may include a blockchain network 1001 and an external device 1002 of the blockchain network 1001. The blockchain network 1001 refers to a network configured to perform data sharing between nodes, and the blockchain network 1001 may include a plurality of nodes 10011. Each node 10011 may receive input information from the external device 1002 or information broadcast from other nodes during normal operation, and maintain shared data (namely, the blockchain) in the blockchain network based on the received input information. In order to ensure information intercommunication in the blockchain network 1001, an information connection may exist between the nodes, and Peer To Peer (P2P) communication may be implemented between any two nodes, and in particular, the P2P communication may be performed via a wired communication link or a wireless communication link. For example, when any node in the blockchain network receives the input information, other nodes obtain the input information according to a consensus algorithm, and store the input information as data in the shared data, so that the data stored on all nodes in the blockchain network is consistent. The external device 1002 may include: terminal devices 10021, 10022 and 10023, a database 10024, a service server 10025, and an oracle machine 10026. The external device 1002 may access the blockchain network 1001 and may communicate with the node 10011 in the blockchain network 1001.

The node 10011 in the blockchain network 1001 is deployed with the timed smart contract and the oracle machine contract. A user interacts with the blockchain network 1001 by using the terminal devices 10021, 10022 and 10023, the database 10024, the service server 10025, and the oracle machine 10026 to receive or send messages, etc. For example, the oracle machine 10026 sends the current time to the oracle machine contract.

The terminal devices 10021, 10022 and 10023 may be a variety of electronic devices having a display screen and supporting web browsing, including, but is not limited to, smartphones, tablets, laptops, desktops, and the like.

The node 10011 in the blockchain network 1001 may be a server that provides various services, for example, a management server that provides support for transaction data submitted by the user using the terminal devices 10021, 10022 and 10023. For another example, a background management server that provides support for reconciliation data submitted by the service server 10025 or the database 10024, and for still another example, a management server that provides support for service data or reconciliation data submitted by or for the current time (only for illustration). The node 10011 in the blockchain network 1001 may call the corresponding smart contract for the received service data or reconciliation data, etc. to perform analysis and other processing on the service data or the reconciliation data according to the smart contract.

It is to be noted that the registration method of the timed smart contract in the blockchain or the execution method of the timed smart contract in the blockchain provided by the embodiments of the present disclosure is generally executed by the node 10011 in the blockchain network 1001, and accordingly, the registration apparatus of the timed smart contract in the blockchain or the execution apparatus of the timed smart contract in the blockchain is generally provided in the node 10011 in the blockchain network 1001.

It is to be understood that the number of nodes, terminal devices, databases, service servers, and oracle machines in the blockchain network in FIG. 10 is merely illustrative. There may be any number of nodes, terminal devices, databases, service servers, and oracle machines in the blockchain network according to implementation requirements.

Figure 11:
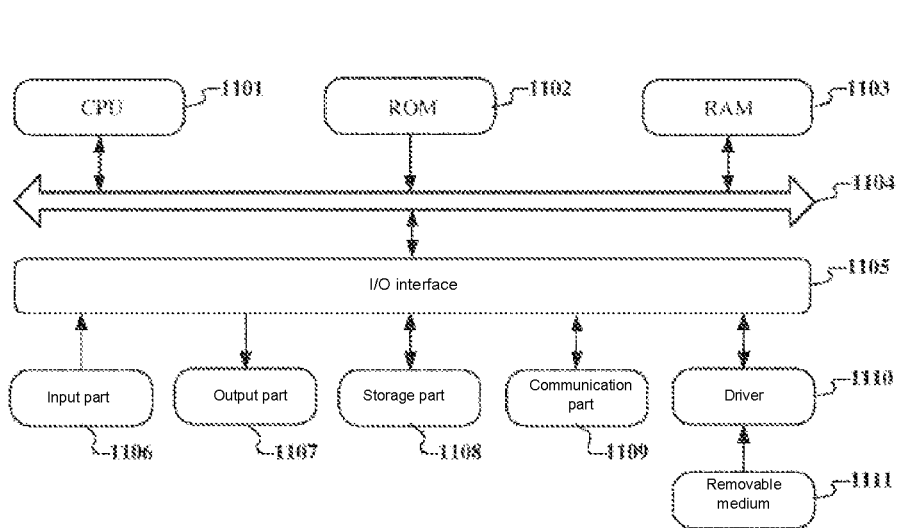
FIG. 11 is a schematic structural diagram of a computer system suitable for implementing a node on a blockchain in an embodiment of the present disclosure.

Referring to FIG. 11 below, which shows a schematic structure diagram of a computer system 1100 suitable for implementing a terminal device in an embodiment of the present disclosure. The nodes on the blockchain shown in FIG. 11 are merely an example and should not impose any restrictions on the functionality and scope of use of the embodiments of the present disclosure.

As shown in FIG. 11, the computer system 1100 includes a Central Processing Unit (CPU) 1101 that performs various suitable actions and processing according to programs stored in a Read Only Memory (ROM) 1102 or loaded from a storage part 1108 into a Random Access Memory (RAM) 1103. Various programs and data required for the operation of the system 1100 are also stored in the RAM 1103. The CPU 1101, the ROM 1102, and the RAM 1103 are connected to each other through a bus 1104. An Input/Output (I/O) interface 1105 is also connected to the bus 1104.

The following components are connected to the I/O interface 1105: an input part 1106 including a keyboard, a mouse, etc.; an output part 1107 including a Cathode Ray Tube (CRT), a Liquid Crystal Display (LCD), a speaker, etc.; a storage part 1108 including a hard disk, etc.; and a communication part 1109 including a network interface card such as a Local Area Network (LAN) card and a modem. The communication part 1109 performs communication processing via a network such as Internet. A driver 1110 is also connected to the I/O interface 1105 as required. A removable medium 1111, such as a magnetic disk, an optical disk, a magneto-optical disk, or a semiconductor memory, is installed on the driver 1110 as needed, so that a computer program read therefrom is installed into the storage part 1108 as needed.

In particular, the process described above with reference to a flowchart may be implemented as a computer software program according to the disclosed embodiments of the present disclosure. For example, the disclosed embodiments of the present disclosure include a computer program product including a computer program carried on a computer-readable medium, the computer program including a program code for performing the method shown in the flowchart. In such an embodiment, the computer program may be downloaded and installed from the network via the communication part 1109, and/or from the removable medium 1111. The computer program is executed by the CPU 1101 to perform the functions limited in the system of the present disclosure.

It is to be noted that the computer-readable medium shown in the present disclosure may be either a computer-readable signal medium or a computer-readable storage medium or any combination thereof. The computer-readable storage medium may be, but not limited to, for example, an electrical, magnetic, optical, electromagnetic, infrared, or semiconductor system, apparatus or device, or any combination thereof. More alternative examples of the computer-readable storage medium may include an electrical connector with one or more wires, a portable disk, a hard disk, an RAM, an ROM, an Erasable Programmable ROM (EPROM or a flash memory), an optical fiber, a Compact Disc ROM (CD-ROM), an optical storage device, a magnetic storage device, or any proper combination thereof. In the present disclosure, the computer-readable storage medium may be any physical medium including or storing a program, and the program may be used by or in combination with an instruction execution system, apparatus or device. However, in the present disclosure, the computer-readable signal medium may include a data signal in a baseband or propagated as part of a carrier, a computer-readable program code being carried therein. A plurality of forms may be adopted for the propagated data signal, including, but is not limited to, an electromagnetic signal, an optical signal, or any proper combination. The computer-readable signal medium may also be any readable medium except the computer-readable storage medium, and the computer-readable medium may send, propagate, or transmit a program configured to be used by or in combination with an instruction execution system, apparatus, or device. The program code in the computer-readable medium may be transmitted with any proper medium, including, but not limited to, radio, a wire, an optical cable, Radio Frequency (RF), etc., or any proper combination thereof.

The flowcharts and block diagrams in the drawings illustrate the architecture, functionality, and operation of systems, methods, and computer program products that may be realized according to various embodiments of the present disclosure. In this regard, each block in the flowchart or block diagram may represent a module, a program segment, or a portion of a code, which comprises one or more executable instructions for implementing the specified logic function. It is also to be noted that in some alternative implementations, the functions marked in the blocks may also occur in a different order from those marked in the drawings. For example, two blocks shown in succession may, in fact, be executed substantially in parallel, and sometimes in a reverse order, depending upon the functionality involved. It is also to be noted that each block in the block diagram or flowchart, and a combination of blocks in the block diagram or flowchart may be implemented by a special purpose hardware-based system which performs a specified function or operation, or a combination of special purpose hardware and computer instructions.

The units described in the embodiments of the present disclosure may be implemented by means of software or hardware. The units described may also be provided in a processor, for example, a processor may be described as comprising a receiving unit and a registration unit. The names of the units do not constitute a limitation on the unit itself in some cases, for example, the receiving unit may also be described as "a unit receiving a registration request for a timed smart contract".

As another aspect, the present disclosure also provides a computer-readable medium, which may be included in the apparatus described in the above embodiments, or may also be present separately and not fitted into the apparatus. The above computer-readable medium carries one or more programs. One or more above programs are executed by the apparatus to enable the apparatus to include that: a registration request of a timed smart contract is received; according to the registration request, the timed smart contract is registered to an oracle machine contract pre-deployed on the blockchain; and an interface for connecting the timed smart contract to the oracle machine contract is generated for the timed smart contract, so that the oracle machine contract triggers execution of the timed smart contract by means of the interface in a timing manner.

As another aspect, the present disclosure also provides a computer-readable medium, which may be included in the apparatus described in the above embodiments, or may also be present separately and not fitted into the apparatus. The above computer-readable medium carried one or more programs. One or more above programs are executed by the apparatus to enable the apparatus to include that: a current time is received by means of an oracle machine contract, at least one timed smart contract being registered on the oracle machine contract; the current time is matched with registration information of the registered timed smart contract; according to a matching result, at least one timed smart contract to be executed is determined; and execution of the timed smart contract to be executed is triggered by means of the oracle machine contract.

According to the technical solutions of the embodiments of the present disclosure, by registering the timed smart contract deployed on the blockchain on the oracle machine contract, the interface for connecting the timed smart contract to the oracle machine contract is generated for the timed smart contract, and the oracle machine contract triggers the execution of the timed smart contract by means of the interface in a timing manner, so as to achieve the management and execution of the timed smart contract by means of the blockchain. In addition, since the registration and execution of the timed smart contract rely on the oracle machine contract, and communication with an oracle machine outside the blockchain is performed by means of the oracle machine contract, the direct communication between the timed smart contract and the oracle machine outside the blockchain is avoided. At the same time, communication content between the timed smart contract and the oracle machine contract is relatively simple, so that the oracle machine contract is relatively easy to maintain. In addition, by maintaining the oracle machine contract, the timed smart contract can be effectively prevented from external attacks, and the security of the timed smart contract is guaranteed.

The above alternative implementation mode does not constitute a limitation to the scope of protection of the present disclosure. Those skilled in the art should understand that various modifications, combinations, subcombinations, and substitutions can occur, depending upon design requirements and other factors. Any modifications, equivalent substitutions, improvements, etc. within the spirit and scope of the present disclosure shall be included in the scope of protection of the present disclosure.

What is claimed is:

1. An execution method of a timed smart contract in a blockchain, comprising:

receiving, by means of an oracle machine contract, a current time, wherein at least one timed smart contract is registered on the oracle machine contract;

matching the current time with registration information of the at least one registered timed smart contract;

according to a matching result, determining at least one timed smart contract to be executed;

triggering, by means of the oracle machine contract, execution of the timed smart contract to be executed;

providing a built-in block or a built-in area located in a transaction block for the timed smart contract, and configuring a corresponding amount of consumable resources for the built-in block or the built-in area, wherein a transaction of the timed smart contract is recorded in the built-in block or the built-in area; and determining whether an amount of resources currently required is not larger than the amount of consumable resources corresponding to the built-in block or the built-in area, if so, executing the built-in block or the built-in area corresponding to the timed smart contract, and if not, prohibiting the execution.

2. The execution method of the timed smart contract in the blockchain according to claim 1, wherein, the method further comprises: voting a trusted oracle machine from a plurality of oracle machines;

determining the current time by means of the oracle machine contract comprises:

receiving, by means of the oracle machine contract, the current time sent by the trusted oracle machine.

3. The execution method of the timed smart contract in the blockchain according to claim 2, wherein voting the trusted oracle machine from the plurality of oracle machines comprises:

determining the trusted oracle machine from the plurality of oracle machines by adopting a polling manner; or, selecting an oracle machine with a voting ratio not lower than a preset ratio threshold from the plurality of oracle machines as the trusted oracle machine by adopting a voting manner.

4. The execution method of the timed smart contract in the blockchain according to claim 2, further comprising:

generating a log, and recording the current time received by the oracle machine contract in the log;

when a lookup request of a trusted node or other trusted oracle machines in the blockchain is received, providing the log for the trusted node or other trusted oracle machines;

verifying whether the current time recorded in the log is accurate according to a lookup result; and if not, marking the trusted oracle machine as being un-trusted, and re-executing a step of voting the trusted oracle machine from the plurality of oracle machines.

5. The execution method of the timed smart contract in the blockchain according to claim 2, wherein, a contract feature identification corresponding to the timed smart contract and a corresponding trigger time are stored in a first registry comprised in the oracle machine contract;

matching the current time with the at least one registered timed smart contract comprises:

finding at least one target trigger time consistent with the current time in the first registry;

determining the at least one timed smart contract to be executed comprises:

matching a corresponding target contract feature identification for each of the at least one target trigger time, and determining a timed smart contract corresponding to the target contract feature identification as the timed smart contract to be executed.

6. The execution method of the timed smart contract in the blockchain according to claim 5, wherein, logic feature identifications corresponding to a plurality of processing logic and logic trigger time information corresponding to each of the plurality of processing logic comprised in the timed smart contract are further stored in the first registry;

matching the current time with the at least one registered timed smart contract further comprises:

finding at least one piece of target logic trigger time information consistent with the current time; and matching a corresponding target contract feature identification and a target logic feature identification for each piece of the target logic trigger time information.

7. The execution method of the timed smart contract in the blockchain according to claim 6, wherein, after determining the timed smart contract to be executed, the method further comprises: determining a processing logic to be executed in the timed smart contract to be executed according to the target logic feature identification;

triggering, by means of the oracle machine contract, the timed smart contract to be executed comprises: triggering, by means of the oracle machine contract, execution of the processing logic to be executed in the timed smart contract to be executed.

8. The execution method of the timed smart contract in the blockchain according to claim 2, wherein, a contract feature identification and a corresponding time trigger function corresponding to the timed smart contract are stored in a second registry comprised in the oracle machine contract;

matching the current time with the at least one registered timed smart contract comprises:

finding at least one target time trigger function that the current time satisfies in the second registry;

determining the at least one timed smart contract to be executed comprises:

matching a corresponding target contract feature identification for each of the at least one target time trigger function, and determining a timed smart contract corresponding to the target contract feature identification as the timed smart contract to be executed.

9. The execution method of the timed smart contract in the blockchain according to claim 8, wherein, logic feature identifications corresponding to a plurality of processing logic and a time trigger function corresponding to each of the plurality of processing logic comprised in the timed smart contract are further stored in the second registry;

matching the current time with the at least one registered timed smart contract further comprises:

finding at least one target time trigger function that the current time satisfies in the second registry; and matching a corresponding target contract feature identification and a target logic feature identification for each target time trigger function.

* * * * *